United States Patent [19]

Gregg et al.

[11] Patent Number: 5,002,622

[45] Date of Patent: Mar. 26, 1991

[54] GLASS BASED OPTICAL DISC MANUFACTURING PROCESS

[75] Inventors: David P. Gregg, Culver City; Kenneth L. Keester, Pasadena, both of Calif.

[73] Assignee: Del Mar Avionics, Irvine, Calif.

[21] Appl. No.: 316,027

[22] Filed: Feb. 27, 1989

[51] Int. Cl.$^5$ .............................................. B32B 31/16
[52] U.S. Cl. ..................... 156/209; 156/242; 156/243; 360/135; 369/286; 369/288
[58] Field of Search .................. 156/89, 242, 243; 360/135; 365/286, 288

[56] References Cited

U.S. PATENT DOCUMENTS

| | | | |
|---|---|---|---|
| 4,600,682 | 7/1986 | Spong et al. | 369/286 |
| 4,831,608 | 5/1989 | Tsukane et al. | 369/286 |
| 4,861,656 | 8/1989 | Uchiyama et al. | 360/135 |
| 4,871,601 | 10/1989 | Miura et al. | 369/286 |

Primary Examiner—Caleb Weston
Attorney, Agent, or Firm—W. Douglas English

[57] ABSTRACT

A process for manufacture of a second surface optically recordable disc having ultraviolet (UV) inhibiting characteristics is disclosed. A reflective lamina of aluminum, superimposed on a glass lamina substratum, is flow process produced by pyrolysis and precipitation of a lamina of aluminum from gasified triisobutyl aluminum onto a lamina web of silicate (amorphous glass) which is concomitantly pyrolized from tetraethoxy silane, with or without alkoxide additives, and precipitated upon a flowing body of molten tin to form a composite lamination sheet. To complete the process, an optically active lamina which is applied over the reflective lamina is embossed with optically transparent ultraviolet (UV) inhibiting polycarbonate, protective covers, the mating surface of which, may be, pregrooved and coded to form second surface optically active media. Covers with bonded lamination are then successively severed from the laminated sheet to yield independent second surface optically recordable media.

12 Claims, 3 Drawing Sheets

GLASS BASED OPTICAL DISC MANUFACTURING PROCESS

BACKGROUND OF THE INVENTION

1. FIELD OF THE INVENTION:

The invention relates to a method for the manufacture of a second surface optical recording disc, card or device with ultraviolet (UV) inhibiting characteristics.

2. DESCRIPTION OF THE PRIOR ART:

Existing optical disc or card art relating to write once, read many (WORM), magneto-optical type or similar optical recording devices generally consist of a laminated or multilayered structure having a rigid support substratum, a reflective layer, a photosensitive optically reactive second surface layer which is, depending upon disc or card application, covered by a first surface optically transparent protective coating layer.

Historically each said layer has been subsequently superimposed intermittently upon the preceding layer on a disc by disc basis, by various succeeding methods such as injection or compression molding, spin coating, sputtering, vacuum deposition, and, in general, by means of individual layer by layer lamination techniques. Each substratum is processed to receive succeeding lamination coatings individually, serially or in batches of small numbers.

More recent trends in optical recording technology have led to development of first surface optically recordable laminations which have been conveniently and efficiently manufactured in relatively wide webs of great length and width. By such means, optical recording laminations can be manufactured in an efficient and economical manner. However, although such first surface optical recording laminations may be cut into circular or rectangular sheets as well as traditional lengthy tapes, the relatively thin, first surface optically recordable discs or cards produced in such manner have significant disadvantages when compared to earlier second surface optical recording structures. In spite of a thin protective coating over the first surface optically recordable layer of such laminated sheets, randomly attracted dust particles of but a micron (u) or so in diameter, not visible to the unaided eye, may lodge very close to the first surface optically reactive layer, thereby blocking out significant areas of the optically reactive layer causing commensurate dropouts of data to be recorded or reproduced and thereby causing subsequent loss of information.

In addition, the relatively thin laminated structure of an optical disc that may be cut from a laminated sheet has no rigid structural component and therefore has a tendency to bend and curl. Therefore, it is necessary that such laminated sheet derived optical recording discs be spun immediately above a flat stationary surface at a speed above a critical minimum which tends to flatten the disc to optical record or reproduce requirements by formation of an air bearing film via the Bernoulli effect. Furthermore, prior art optical recording media tend to decompose naturally in time due to effects of UV radiation. The present invention discloses a means for diminishing the normally incurred decomposition process.

In view of the foregoing prior art limitations there exists a longstanding and continuing need for a new and improved process for mass production of optical recording disc or cards having the rigid, second surface optical attributes of a thick and transparent substratum and therefore a surface which will hold dust and mechanical defects at a safe distance from the plane of a focussed record or reproduce beam on the recordable layer, yet also having the economical manufacturing advantages of a first surface optical lamination of large sheets of an optical recording medium.

The invention disclosed herein overcomes prior art limitations by combining the technical advantages of a second surface optical medium together with the manufacturing simplicity and efficiency of a first surface optical recording medium.

SUMMARY OF THE INVENTION

The invention disclosed herein provides a method of fabrication of UV inhibited second surface optical recording discs or cards by combining attributes of two existing optical recording media, i.e. first surface optically recordable laminae and second surface optically recordable discs, and in addition provides a unique laminating process. The invention conceives a continuous process for applying an optically transparent UV inhibiting cover, conventionally injection molded in disc shape or other desired shape, with or without preset data or tracking grooves as desired, to an assembly line produced first surface optical recording lamination conventionally having a pliant web support base, a reflective layer, and an optically reactive layer. The web support base is created by deposition of and extraction of a silicate glass, such as silicon dioxide glass ($SiO_2$), from a fluid flow and subsequent pyrolysis of tetraethoxy silane [$(C_2H_5O)_4 Si$], also known as tetraethyl orthosilicate [$(C_2H_5)_4SiO_4$], on a hot molten metal surface, such as tin (Sn) such that a web lamina of glass is formed thereon. Concomitant with said glass web formation, a web lamina of aluminum (Al) is deposited on the glass web in a similar manner by extraction of aluminum from a fluid/flow of an aluminum alkyl, such as triisobutyl aluminum [$Al (C_4H_9)_3$] on the hot surface of the congealed glass web. Following formation of the glass-aluminum lamination, an optically active layer is applied to the reflective aluminum layer. The cover component is compressed and embossed into the first surface optical recordable lamination component to bond and seal permanently the two components and thereby yield a second surface optical recording medium. The newly formed second surface optical recording structure is then cut from the laminated sheet to yield an independent second surface optical recording medium that is, in essence, manufactured in a simple and efficient flow process as opposed to the conventional multistep process of manufacturing a second surface optical recording disc by starting with a disc substratum and then successively adding each desired layer, i.e. reflective layer, protective layer, etc., on a disc by disc basis.

OBJECT OF THE INVENTION

It is therefore a primary object of the invention to provide an improved efficient and cost-saving method for mass production of second surface optical recording media by combining and utilizing portions of two distinct and independent existing methods of manufacturing:

1. First surface optical recording lamination sheets or tapes; and
2. Second surface optical recording discs or cards.

Another object of the invention is to make a lamina substratum as part of a unified disc formation process by pyrolisis extraction of a silcate (glass) lamina from a fluid flow of tetraethoxy silane with or without alkoxide additives upon a flowing surface of molten tin. A further object of the invention is to superimpose as part of a unified disc formation process a reflective lamina upon the glass lamina substratum by pyrolysis extraction of an aluminum lamina from a fluid flow of triisobutyl aluminum upon the flowing glass lamina. Yet another object of the invention is to utilize at least two transformers whose conduction paths pass through and thereby resistively heat different volumes of molten tin to establish a temperature gradient between said volumes and thereby effectively pyrolize both tetraethoxy silane and triisobutyl aluminum on the surface of the molten tin. Yet a further object of the invention is to make novel second surface optically recordable media having inherent UV inhibiting characteristics.

The foregoing and other objectives, features, benefits, and advantages of the disclosed invention will become more readily apparent upon reading the following detailed description of the preferred embodiment in view of the accompanying drawing and appended claims.

DETAILED DESCRIPTION OF A PREFERRED EMBODIMENT

Figure 1:
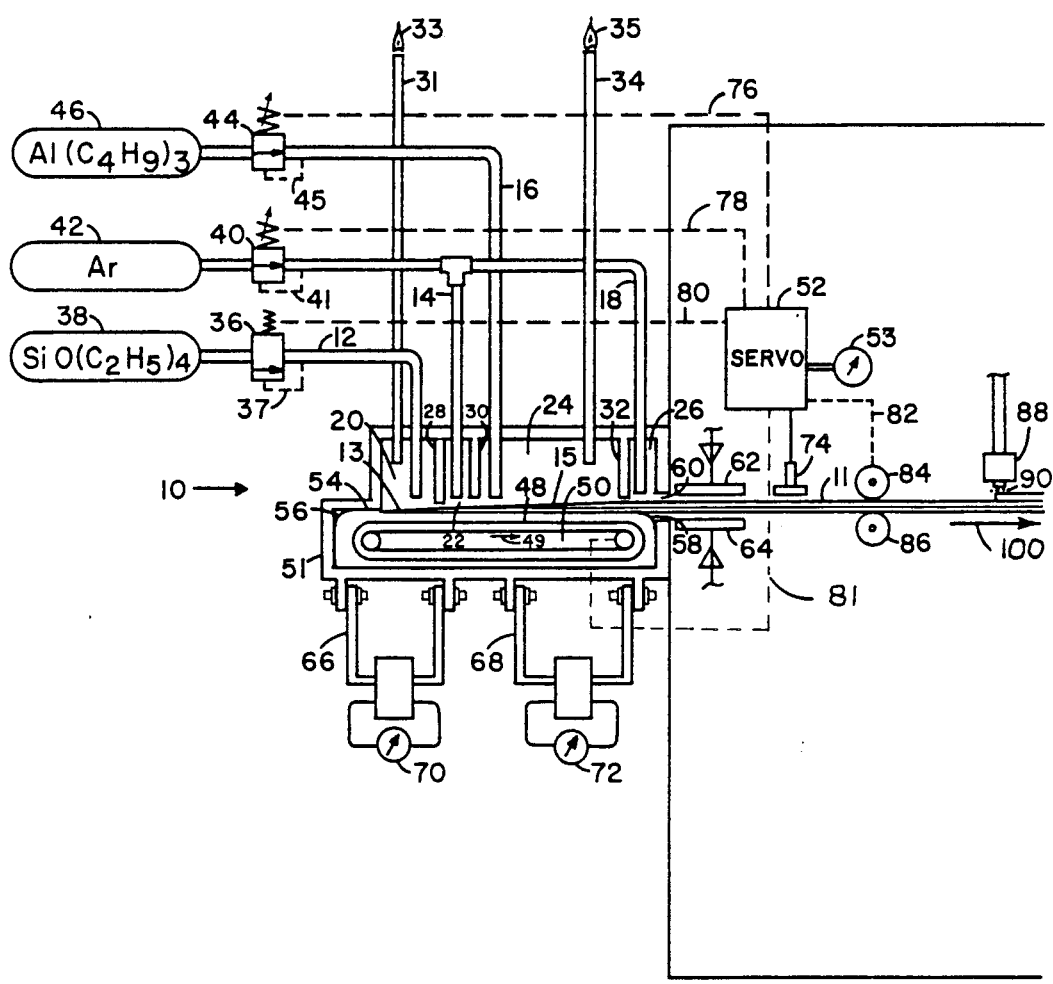
FIG. 1 illustrates an overall view of the manufacturing process to produce second surface optically recordable discs.
Figure 1:
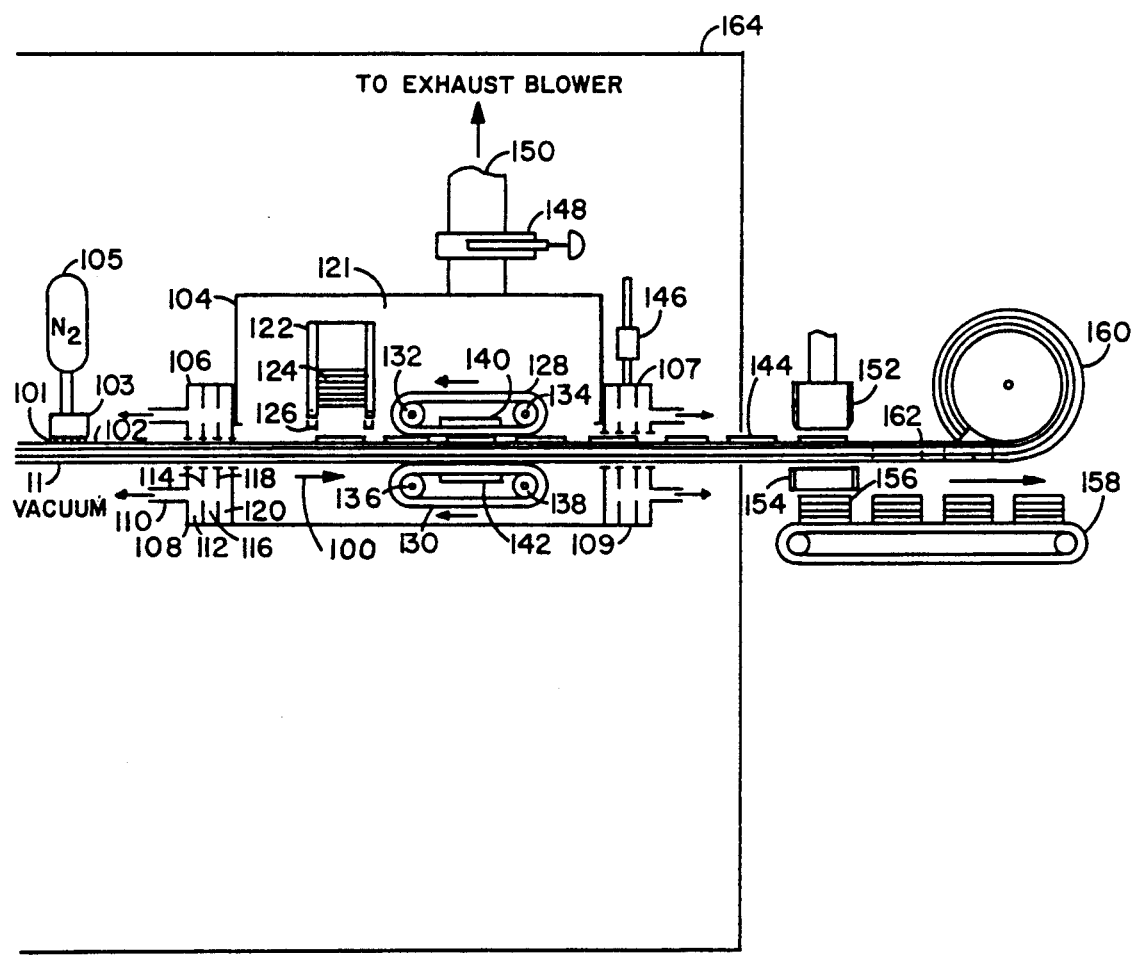

The conceptual method for manufacture of second surface optically recordable media is, in large part, illustrated in FIG. 1. The flow schematic of FIG. 1 illustrates an overall view of the process and system claimed herein. It should be understood that various laminae or thin layers described in the system of FIG. 1 are not drawn to relative scale with respect to each other or the mechanisms through which they pass. All laminae are drawn with equal thickness for clarity of illustration.

Referring to FIG. 1, an internal view of a rectangular laminating enclosure 10 is illustrated having a first, second, third and fourth fluid inlets 12, 14, 16 and 18 leading to a first, second, third and fourth vacated upper compartments, 20, 22, 24 and 26, respectively, separated by a first, second and third baffels 28, 30 and 32. A first and second combustible gas outputs 31 and 34, respectively, allow for exit of nonuseable gases which may be flared at a distal ends thereof 33 and 35.

First fluid, inlet 12 is coupled through a first regulator 36, with flow feedback 37, to a tetraethoxy silane (TEOS) solution, [$(C_2H_5)_4SiO_4$] or [$Si(C_2H_5O)_4$], liquid with or without other metal alkoxide additives dissolved in an appropriate organic solvent. Other metal alkoxide additives might be aluminum isopropoxide, [$Al(C_3H_7O)_3$], sodium methoxide [$Na(CH_3O)$], lithium ethoxide [$Li(C_2H_5O)$], or calcium methoxide, [$Ca(CH_3O)_2$]; solvents for the foregoing solutes might be methanol ($CH_3OH$), ethanol ($C_2H_5OH$), propanol ($C_3H_7OH$), butanol ($C_4H_9OH$), or some suitable combination of the foregoing. The purpose of the metal alkoxide additives is to adjust physical or chemical properties of the glass. An example would be to match the thermal expansion of the glass to that of aluminum. Second and fourth inlets 14 and 18 are coupled through a second regulator 40, with flow feedback 41, to an inert gas source 42, argon (Ar). Third inlet 16 is coupled through a third regulator 44, with flow feedback 45, to a triisobutyl aluminum (TIBA), [$Al(C_2H_5)_3$], source 46.

A dual-sprocket ladder chain-drive 48, traveling in the direction indicated by arrow 49 circulates throughout a body of molten metal such as tin (Sn) 50 in a lower compartment 51 of laminating enclosure 10. Chain drive 48 may be regulated by servo means 52 coupled to other components of the overall laminating process for proper timing as would be conventinal in the art. Lower compartment 51 is provided with a forward indent 54 that is designed to be tangential to the surface of circulating molten metal 50 such that a forward meniscus 56 will not be allowed to interfere with lamination initiation thereon. An exiting miniscus 58, at an exit window 60 of enclosure 10, allows separation of a lamination formed on molten metal 50 surface while passing through and supported by superior and inferior air bearings 62 and 64, respectively. Lower compartment 51, and molten metal 50 therein, are maintained at an elevated temperature by first and second transformers 66 and 68 which are independently regulated by a first and second variacs 70 and 72, respectively, such that the forward volume of molten metal 50 may be maintained at a higher temperature by transformer 66, relative to the exit volume heated by transformer 68. It should be noted that the currents generated by transformer 66 and 68 actually pass through molten metal 50, which in the preferred embodiment is tin, and due to resistance to relative current flow therein, generates the respective heat. Formation of a glass based dual lamination 11, which emanates from exit window 60, begins by deposition of a liquid layer of tetraethoxy silane solution (TEOS) 38 through inlet 12 on the surface of molten tin 50.

The high heat of approximately 270° C. at the forward surface of molten tin 50 pyrolizes the TEOS and thereby extracts from the TEOS an amorphous glass lamina 13 comprising silicate glass on the surface of molten tin 50.

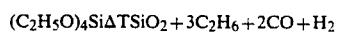

$$(C_2H_5O)_4Si \triangle TSiO_2 + 3C_2H_6 + 2CO + H_2$$

Thickness of the lamina is in direct proportion to the volume flow of TEOS and the speed of the moving surface of molten tin 50, which in turn is maintained in motion by chaindrive 48. An inert gas, which is argon (Ar) in the preferred embodiment, is applied to second compartment 22 at a pressure somewhat higher than any gas pressure in first compartment 20, such that the multitude of low atomic weight gases given off in the pyrolysis of TEOS to form glass lamina 13, is vented through first exit pipe 31 and flared at 33. The flow of molten tin 50, from first, second and third compartments 20, 22 and 24, toward exit window 60 caused by chain drive 48, carries glass lamina 13 with a desired thickness determined by temperature of molten tin, by volume flow of TEOS, by speed of chain drive 48, by length of first compartment 20, and by rate of flow of lamina 13 as it is pulled from enclosure 10.

When the desired thickness of glass lamina 13 is achieved, lamina 13 passes through second compartment 22, containing inert gas, into third compartment 24 where a gas flow of triisobutyl aluminum (TIBA) is applied to the surface thereof. Again, the continuous flow of inert gas (Ar) into second and fourth compartments tends to keep TEOS and pyrolized hydrocarbon gases thereof of low atomic weight in first compartment 20, and likewise maintains TIBA and pyrolized gases thereof in third compartment 24.

As pyrolysis of TIBA occurs in third compartment 24, an aluminum (Al) lamina 15 is precipitated upon glass lamina 13 forming a composite lamination 11.

$$2Al(C_4H_9)_3 \Delta T 2Al + 6C_4H_8 + 3H_2$$

As with formation of glass lamina 13, a desired thickness of 25 micrometers (um) of aluminum lamina 15 is determined by temperature, by volume flow of TIBA, by speed of chain drive 48 and accompanying flow of tin, by length of third compartment 24, and by rate of flow of composite lamination 11, as it is pulled from enclosure 10. It should be noted that flow of argon gas in fourth compartment 26 not only maintains TIBA and pyrolized gas derivatives thereof, in third compartment 24, but also keeps contaminates, exterior to enclosure 10, out of enclosure 10, and thereby maintains a clean laminating process. Aluminum reflective lamina 15, having reflectivity characteristics of at least 80%, is an aluminum lamina in the preferred embodiment of approximately 25 micrometers in thickness but may also be any reflective metal, metallic compound or alloy. As described above reflective lamina 15 is derived in the preferred embodiment from the precipitation of pure aluminum from a gas of triisobutyl aluminum $[Al(C_4H_9)_3]$, flowing upon a body of molten tin, with butene ($C_4H_8$) and hydrogen ($H_2$) deriviatives given off.

The principles and one typical application of the aluminum deposition process is described in a publication of the Office of Technical Services of the U.S. Department of Commerce, June 1959, titled, "Development of a Method to Accomplish Aluminum Deposition by Gas Plating."

Composite lamina 11, thusly created exits enclosure 10 by automatically separating from tin meniscus 58 at exit slot 60. On exiting therefrom, lamina 11 is first supported by superior and inferior air bearings 62 and 64 respectively, conventional to the art. A thickness sensor 74, may be any conventional x-ray, dielectric type or type sensor having the capacity to monitor and assure that a consistent and desired thickness of aluminum reflective lamina and glass lamina are maintained. To do so, a servo mechanism 52, having a thickness adjusting sensor 53, is coupled via dashed lines 76, 78, 80, 81 and 82 to TIBA mixture regulator 44, to argon regulator 40, to TEOS regulator 36, to chain dirve 48 and to tensioning and speed control mechanisims 84 and 86, conventional to the art. If more aluminum is needed to yield a thicker aluminum reflective lamina 15, then regulator 44 is opened more to allow a greater flow of TIBA mixture into third compartment 24 of enclosure 10. Likewise, if more glass lamina thickness is needed TEOS regulator 36 is opened wider to allow a greater flow of TEOS into first compartment 20.

Composite lamination 11 is next pulled under a dye polymer dispenser 88 where an optically reactive dye polymer lamina 90 is sprayed finely and uniformly across the surface of reflective aluminum lamina 15 to complete a process of forming a first layer optically reactive (recordable) laminated sheet. Optically reactive lamina 90, which is generally in the realm of 100 nanometers (nm) in thickness, is a soluble dye polymer or dye-binder polymer blend, and is illustrated as being sprayed onto reflective lamina 15, in a finely atomized spray; however, lamina 90, may likewise be applied by rolling or dipping techniques, conventional to the art. Following application of optically active lamina 90, an adhesive lamina 101 is applied by a finely atomized spray of an adhesive dispenser 103, operated upon by a pressurized nitrogen gas ($N_2$) source 106. However, it is understood that the functions of dye polymer and adhesive may be combined by use of a similar substance having both characteristics, e.g. an adhesive dye polymer.

The thusly formed first surface optically recordable laminated sheet 102, comprising optically active lamina 90, reflective lamina 15, and glass substratum lamina 13, is next passed through a partially evacuated cover placement and embossing compartment 104. On entering compartment 104, laminated sheet 102, first passes through a superior and an inferior stationary triple compartment entrance gland seals, 106 and 108 respectively. Entrance gland seals 106 and 108 and exit gland seals 107 and 109, operate to create a partial vacuum within compartment 104. Referring to gland seal 108, but applicable to all other gland seals, an outlet 110 is coupled to a vacuum pump creating a partial vacuum in first gland compartment 112. A first gland partition 114, having a small passage therethrough, allows for a creation of a greater vacuum in second gland compartment 116. Similarly, a second gland partition 118, having a small passageway therethrough, allows for creation of an even greater vacuum in third gland compartment 120, which leads to creation of a better vacuum in interior 121 of compressing compartment 104.

A cover storage and dispensing device 122, positioned within compressing compartment 104, retains a stock of disc shaped covers 124 that are retained and dropped one at a time at regulated intervals by tripping means 126. Covers 124 may be in the preferred embodiment 80, 120, 130 or 200 millimeters (mm) in diameter and approximately one (1) mm in thickness. Covers 124, may be injection or compression molded, optical grade polycarbonate or polymethylmethacrylate (PMMA) of low birefringence. The optical material, however, comprising disc covers 124, is first treated for low transmittance of ultraviolet (UV) energy in order that protective cover 124, once mated with optically recordable laminated sheet 102, will not transmit damaging light energy that would decompose the dye polymer comprising the optically active lamina of the recordable medium when subjected to an environment of harmful radiation. Ultraviolet (UV) absorbing material of the hydroxyphenyl benzotriazole class, an example of which might be a compound commercially offered under Cyanamid Corporation trademark "Cyasorb," UV 5411, may be spin coated upon covers 124 or may be an additive to the molding compound itself.

As laminated sheet 102 flows along at a constant rate in the direction indicated by arrow 100, disc dispenser 122 systematically drops individual covers 124, on adhesive lamina 101. Laminated sheet 102, with cover 124, is then compressed for permanent bonding and embossing between a superior and an inferior conveyor belt, 128 and 130, respectively. A superior and an inferior back plate, 140 and 142 respectively, are fixedly positioned behind conveyor belts 128 and 130, respectively, to guide and maintain position of belts 128 and 130, as they compress and emboss covers 124, into adhesive lamina 101, and into optically active lamina 90, of laminated sheet 102.

Adding covers 124 to laminated sheet 102, converts the first surface optically recordable laminated sheet 102, into second surface optically recordable media 144. Second surface optically recordable media 144 exit embossing enclosure 104 through exit gland seals 107 and 109. Although all other gland seals, 106, 108 and 109 are stationary, superior exit gland seal 107, is provided with lifting means 146 to temporarily lift seal 107, as newly formed second surface optically recordable media 144 exit enclosure 104.

When gland seal 107 lifts to allow media 144 to exit enclosure 104, the partial vacuum in enclosure 104 is, of course, temporarily lost. Therefore, a slide valve 148 is provided in the intake side of an exhaust blower 150, such that as gland seal 107 is lifted slightly, slide valve 148 is closed. As gland seal 107 is returned to its seat, slide valve 148 is opened allowing exhaust blower 150 to evacuate enclosure 122 once more.

Laminated sheet 102 with newly formed second surface optically recordable media 144 embossed therein now passes through a superior and inferior disc cutting means 152 and 154, respectively. Cutting means 152 and 154 are basically cylindrical punches in the preferred embodiment but may, of course, be any desired geometrical shape to make a variety of uniquely shaped recordable media for particular applications. Superior punch 152 is designed to be the same shape and diameter as covers 124 in the preferred embodiment.

Punches 152 and 154 function in such manner that as covers 124 and respective embossed portion of laminated sheet 102 are severed from laminated sheet 102, the embossed laminated portion of the individual second surface optically recordable disc 156 thereby formed extends as a lip around the periphery of respective covers 124, attached thereto. Diameter of laminated sheet 102 should be somewhat 23% greater than diameter of respective covers 124.

Figure 2A:
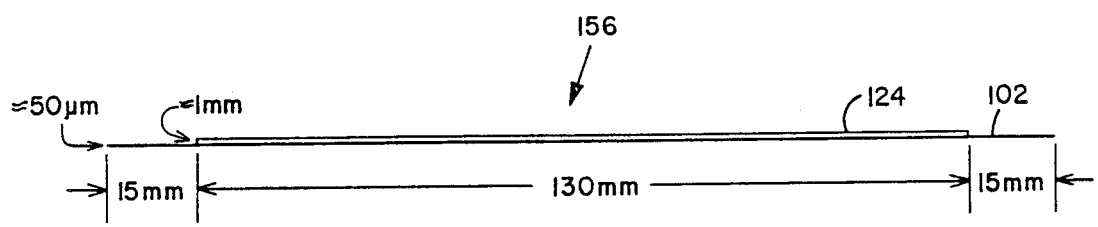
FIG. 2A illustrates a sideview of the second surface optically recordable disc on severance from laminated sheet.
Figure 2B:
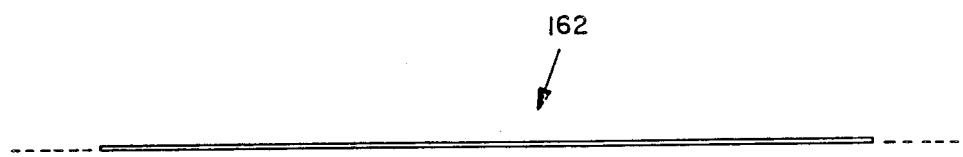
FIG. 2B illustrates the completed optical disc with trimmed and sealed edge/periphery.

Once the second surface recordable medium 144 is cut from laminated sheet 102, it is converted into a second surface recordable disc 156, and is dropped to a finishing conveyor belt 158. Laminated sheet 102, with holes 162, punched therethrough is collected by a tension regulated collection roller 160 for disposal. As illustrated by an overall process enclosure 164, the foregoing process is not necessarily confined to a cleanroom environment, but within a clean environment by virtue of the higher gas pressure inside enclosure 164, than outside thereof. As described above, laminated sheet 102, comprising glass substratum lamina 13, reflective lamina 15, and reactive lamina 90, as well as transparent covers 124, have been grossly distorted in relative thickness in FIG. 1 for purpose of illustration of the overall invention flow process. FIG. 2 provides, however, a clearer view of the relative dimension and a proper perspective of the semi-finished and finished product, FIG. 2a and FIG. 2b, respectively. In FIG. 2a, a 130 mm cover 124, having a 15 mm extended laminated 102 lip, is subjected to a cutting, trimming and sealing process, conventional in the art. Faying surface of cover 124 is conventionally sealed with any of various thermoplastic or thermosetting resins, widely varying in flexibility, used in tough chemical-resistive coatings and adhesives, e.g. polyurethane, to yield the finished 130 mm, second surface optically recordable disc, illustrated in FIG. 2b.

As is customary, although a particular embodiment of the invention has been illustrated and described, it is understood that obvious modifications and alterations of components thereof, within the ambit of the disclosure, and claims directed thereto, are anticipated. It is intended, therefore, that the following claims be interpreted to cover all such modifications which fall within the spirit and scope of the invention.

What is claimed is:

1. A laminating process for manufacture of second surface optically recordable media, comprising the steps of:
   pyrolizing a first fluid to form a substratum lamina;
   subsequently pyrolizing a second fluid to form a reflective lamina upon and bonded to said substratum lamina;
   covering and bonding said reflective lamina with an optically active lamina to form a first surface optically recordable laminated sheet;
   covering said optically active lamina with an optically transparent adhesive lamina;
   sequentially applying individual optically transparent, UV limiting covers to said adhesive lamina;
   compressing and embossing each said cover into said adhesive lamina and said optically active lamina to form a series of individual second surface optically recordable media; and
   severing each said individual second surface optically recordable medium from said series of media to form discrete second surface optically recordable media.

2. A laminating process according to claim 1, wherein said substratum lamina is formed by extracting a lamina of amorphous glass from a fluid flow of a silicate compound and depositing said glass lamina upon a flowing surface of molten metal.

3. A laminating process according to claim 2, wherein said silicate compound is tetraethoxy silane.

4. A laminating process according to claim 1, wherein said reflective lamina is formed by extracting a lamina of reflective metal from an organometallic compound and applying said reflective lamina to said substratum lamina.

5. A laminating process according to claim 4, wherein said compound is triisobutyl aluminum.

6. A laminating process according to claim 1, wherein said optically active lamina is formed by spraying a lamina of a dye polymer upon said reflective lamina.

7. A laminating process according to claim 1, wherein said adhesive lamina is formed by spraying a lamina of adhesive upon said active lamina.

8. A laminating process according to claim 1, wherein said covers are injection molded polymers.

9. A laminating process according to claim 8, wherein said polymer is polymethylmethacrylate.

10. A laminating process according to claim 8, wherein said polymer is polycarbonate.

11. A laminating process according to claim 8, wherein said covers are pregrooved.

12. A laminating process according to claim 8, wherein said covers are prerecorded.

* * * * *